United States Patent [19]

Sikdar

[11] 4,264,563

[45] Apr. 28, 1981

[54] PREPARATION OF CALCIUM FLUORIDE FROM FLUOSILICIC ACID SOLUTIONS

[75] Inventor: Subhas K. Sikdar, Schenectady, N.Y.

[73] Assignee: Occidental Research Corp., Irvine, Calif.

[21] Appl. No.: 29,178

[22] Filed: Apr. 12, 1979

[51] Int. Cl.³ .................. C01B 33/10; C01B 33/24
[52] U.S. Cl. .................... 423/331; 423/341; 423/321 R; 423/462; 423/490
[58] Field of Search ............. 423/489, 331, 490, 341, 423/321 R, 324, 462, 472

[56] References Cited

U.S. PATENT DOCUMENTS

| 2,780,523 | 2/1957 | Gloss | 423/490 X |
|---|---|---|---|
| 2,914,474 | 11/1959 | Hillyer et al. | 423/490 X |
| 3,551,332 | 12/1970 | Baumann et al. | 423/490 X |
| 3,907,978 | 9/1975 | Spreckelmeyer | 423/490 |
| 4,031,193 | 6/1977 | Becher et al. | 423/490 |
| 4,136,199 | 1/1979 | Mills | 423/321 R |
| 4,171,342 | 10/1979 | Hilko et al. | 423/490 X |

FOREIGN PATENT DOCUMENTS 947,068  1/1964  United Kingdom .................... 423/490

*Primary Examiner*—Earl C. Thomas
*Attorney, Agent, or Firm*—Barry A. Bisson; Robert A. Franks; William N. Patrick

[57] ABSTRACT

A fluosilicate material is added to a suspension of lime in water heated to a temperature at or near its boiling point to form a solid calcium fluoride product in which the silicon present in the fluosilicate material is in chemical combination with calcium. The amount of calcium in the suspension is in excess of stoichiometric for conversion of $CaF_2$ of all of the fluorine in the fluosilicate and is sufficient to form chemical compounds of calcium and silicon from silicon in the fluosilicate.

11 Claims, No Drawings

PREPARATION OF CALCIUM FLUORIDE FROM FLUOSILICIC ACID SOLUTIONS

BACKGROUND OF THE INVENTION

This invention relates to the preparation of a calcium fluoride containing solid from fluosilicic acid ($H_2SiF_6$) solutions. More particularly, the invention is related to preparing a calcium fluoride which does not contain significant amounts of free silica, e.g. silica gel or a silica sol, which could interfere with the use of the calcium fluoride in treating impure phosphoric acid for the removal of contaminants.

U.S. Pat. No. 2,780,523 to Gloss describes the preparation of calcium fluoride from weak solutions of fluosilicic acid (less than 4% $H_2SiF_6$) which are derived from scrubbing waste gas streams with water. Precipitation is done by adding calcium carbonate in two stages: first, neutralizing about 85% of the acid with $CaCO_3$, recovering a solid product with a low silica content (less than 1.5%), followed by a second addition of $CaCO_3$ to a pH of greater than 7, which yields a solid mixture of calcium fluoride and calcium silicofluoride. Evaporation of the filtrate then yields a low fluoride silica gel product. A temperature range of 60°–90° F. is preferred to avoid contamination of the calcium fluoride from the first precipitation with silica.

U.S. Pat. No. 2,914,474 to Hillyer et al. is for a process to remove fluorine as calcium fluoride from industrial wastewaters in which at least a portion of the fluorine is present as fluosilicate. In this process, an acidic fluorine-containing solution is neutralized with calcium carbonate to a pH of at least 5, and an excess of calcium added, as calcium sulfate, to precipitate calcium fluoride. A temperature in the range of 70°–200° F. is preferred, but higher temperatures are not recommended for this process.

U.S. Pat. No. 3,549,317 to Dorn et al. teaches a process for the preparation of a silica filler having a particular surface area and a calcium fluoride from fluosilicic acid or sodium fluosilicate, present at about 10 to 40% by weight in aqueous medium. The fluosilicate is reacted with calcium carbonate at a temperature above 50° C., preferably 50° to 60° C., until no further evolution of $CO_2$ is observed, forming calcium fluoride and a silica material. The silica is dissolved in sodium hydroxide at temperatures of 50° C. to the boiling point of the mixture, and calcium fluoride removed by filtration. The sodium silicate solution which remains is treated with acid, maintained at a temperature above 90° C. for some period of time, and the precipitated silicia separated by filtration.

U.S. Pat. No. 3,551,332 to Baumann et al. describes a purification treatment for fluorine-containing wastewaters having a pH less than 3. Calcium carbonate is added to produce a pH of 3 to 3.3, yielding a precipitate of calcium fluoride. The filtrate is then treated with lime to a pH greater than 7 (preferably 11 to 12), and additional filtrate added to give a pH of 5.5 to 7. After a settling period, the solids are removed and discharged. An improved process results from the presence of sulfate or phosphate ions in the wastewater. A temperature in the range of 35°–130° F. is useful, with temperatures of 60°–90° F. preferred.

U.S. Pat. No. 3,907,978 to Spreckelmeyer is for the production of a calcium fluoride which has a low silica content. A suspension of calcium carbonate in water is prepared and a stoichiometric deficiency of fluosilicic acid reacted with the suspension. After removing the calcium fluoride which forms (and the unreacted $CaCO_3$), it is treated with additional fluosilicic acid to produce a more pure calcium fluoride. To obtain the desired product, the initial suspension should contain three to five parts of water per part of $CaCO_3$. A temperature of 0°–30° C. is preferred, since silica tends to precipitate at temperatures above 40° C.

U.S. Pat. No. 4,031,193 to Becker et al. discloses a process for preparing calcium fluoride, which is suitable for producing hydrofluoric acid, from a fluosilicic acid. A suspension of calcium carbonate and water (with added sulfate or aluminum ions to promote the desired reaction) is reacted with fluosilicic acid, preferably maintaining a pH of 4 to 5 during the reaction. After the reaction, additional $H_2SiF_6$ is added to yield a pH of 3 to 3.5. A precipitate which contains mostly calcium fluoride is obtained, and the filtrate contains most of the silicon as a silicic acid sol. The preferred temperature ranges is 5° to 30° C., although temperatures in excess of 30° C. may be employed.

U.S. patent application Ser. No. 863,085, filed Dec. 22, 1977, an invention of Mills and Hirko, which is incorporated herein by reference, is directed toward the recovery of calcium fluoride from pond waters resulting from phosphoric acid processing. The pond water is treated in a first stage with calcium carbonate, in an amount of between 0.3 and 0.8 equivalents of $CaCO_3$ per equivalent of fluorine, and then treated in a second stage with additional $CaCO_3$ at no less than 0.8 equivalents per equivalent of fluorine. A solid cake results, and this is treated with a mineral acid and, finally, a water wash to give a calcium fluoride with up to 45% fluorine. The acid and water washes of the solid cake are combined with the treated waste water effluent from the second stage in a third stage, where lime is added and the resulting calcium fluoride filtered out, and the third stage filtrate is carried to additional lime precipitation stages.

The first and second stage reactions can be conducted at temperatures between the freezing point and the boiling point of the pond water, and calcium oxide may be used in place of calcium carbonate. A calcium fluoride results from the process of sufficient purity for the preparation of hydrofluoric acid (less than 5 to 10% $P_2O_5$ and less than 5% $SiO_2$).

Solids which contain calcium fluoride have been used in processes for the purification of wet process phosphoric acid, as in U.S. Pat. No. 4,136,199 to Mills, which is incorporated herein by reference. The calcium fluoride-containing product obtained from pond water by the process of U.S. patent application Ser. No. 457,565, filed Apr. 3, 1974 (now abandoned in favor of Ser. No. 756,009 filed Jan. 3, 1977 which was abandoned in favor of Ser. No. 840,553, filed Oct. 11, 1977, of which the above referenced Ser. No. 863,085 is a continuation-in-part) may be added to impure wet process phosphoric acid and the mixture held at an elevated temperature until a complex compound (which has been found to resemble Ralstonite, $Na_xMg_xAl_{2-x}(F,OH)_6\cdot H_2O$) forms by removing magnesium, aluminum, etc. from the phosphoric acid. Upon filtration to separate the precipitated compound, a purified phosphoric acid is obtained.

U.S. patent application Ser. No. 954,647, an invention of Mills, filed Oct. 25, 1978 (a continuation-in-part of the application which became U.S. Pat. No. 4,136,199 above), which is incorporated herein by reference, further describes the conditions which improve the purification process.

The process of this invention produces a calcium fluoride-containing mixture from fluosilicic acid which can be used in the above described purification of phosphoric acids, but does not require the lengthy silica separation steps previously described, since the silicon present in the fluosilicic acid is rendered substantially inert to phosphoric acids, and therefore does not inhibit the fluorine-contributing ability of the calcium fluoride product which is needed for phosphoric acid purification. Other advantages of the invention include the ability to use less expensive materials in the fabrication of process equipment, since calcium fluoride is formed in an alkaline medium (not the acidic medium for the previously described conventional processes) and the simplicity of separating the suspended calcium fluoride-containing solids which are formed, since there is no silica gel or sol (which impedes filtration) present in the suspension.

The inherent simplicity of conducting the process of this invention will become apparent from the following discussion and examples, and should be compared to the lengthy, multi-step procedures and complex process equipment required in the references previously noted.

DESCRIPTION OF THE INVENTION

In accordance with this invention, a calcium fluoride-containing material is prepared by adding a fluosilicate solution to a slurry of lime, $Ca(OH)_2$, in water, which is maintained at or near its boiling point during the addition and, if desired, for a period of time after the addition has ceased. The product material may be isolated by filtration centrifugation, or other solid-liquid separation methods which are well known to the art.

In contrast with the cited prior art, silicon is not removed from the calcium fluoride product, but instead is rendered substantially inert by means of a chemical combination with calcium, a result which is obtained due to the reaction conditions chosen for the practice of this invention.

A preferred embodiment of the invention comprises the steps of preparing a slurry of lime and water, heating the slurry to the boiling point, and gradually adding fluosilicic acid to the slurry, with thorough mixing, while maintaining the boiling temperature in the slurry (preferably under a reflux condition to avoid excessive water losses during the procedure). It is preferred to permit the boiling to continue for some time after the addition of fluosilicic acid has ceased, for the purpose of promoting the formation of larger, more easily filtered cystals in the solid product, although this is not essential. The product, which comprises calcium fluoride, calcium silicates, and possibly a small amount of unreacted lime, may be isolated by any of a number of solid-liquid separation techniques, most commonly by filtration. Filtration may be accomplished using the hot slurry, or the mixture may be cooled prior to the separation.

Preferably, less than the stoichiometric amount of fluosilicic acid for reaction with lime is used for the reaction, so that the pH of the solution portion of the slurry remains alkaline, most preferred above about pH 12.

A temperature which causes boiling of the slurry is preferred in conducting the process, since higher temperature appears to promote the formation of calcium silicate in the product. Lower temperatures may be used, but the desired reaction may not be complete at temperatures lower than about 80° C. Additional benefit is likely to result from the use of a boiling temperature: the additional slurry agitation which is caused by the boiling process can cause a more easily filtered solid product to form.

The fluosilicic acid reactant may be any grade which is commercially available, including the reagent grade solution analyzing approximately 30% by weight $H_2SiF_6$, or may be the process pond water from phosphoric acid production, which typically contains up to about 5% fluorine. Some of the fluorine in pond water is present as the fluoride ion, and this will also react with calcium ions from the lime, providing additional calcium fluoride in the product. Alternatively, a soluble fluosilicate salt, such as sodium fluosilicate, can be used in the reaction with lime, the salt being added either in solution or as the solid. A combination of pond water and either fluosilicic acid or a fluosilicate salt may also be utilized in this invention.

It has been found that the reaction product is in an easily filtered form, not requiring the use of flocculants or other aids to filtration. This is a distinct improvement over the processes previously noted which involve separations of silica materials, and greatly simplifies the process.

In the preceding discussion and the examples which follow, process conditions, compositions, etc. were given only to more fully describe the invention, and are not intended to be limiting, the scope of this invention being defined only by the appended claims.

EXAMPLE 1

A one liter glass reaction kettle was fitted with a reflux condenser, addition funnel, motor driven stirrer and heating mantle (powered through a variable transformer), and charged with 452 g of deionized water. Solid $Ca(OH)_2$ in the amount of 113 g was added, with stirring to suspend the solids. The suspension was heated to boiling and 150 g of 30% by weight $H_2SiF_6$ was added gradually, over a period of 90 minutes. Boiling was continued for 15 minutes after the addition was complete, then the mixture was allowed to cool to ambient temperature.

The solid and liquid fractions were separated by filtration and analyzed. An X-ray diffraction examination of the solid phase determined the presence of fluorite, $CaF_2$, plus a few additional peaks which indicate the possible presence of one or more of the following: cuspidine $Ca_4F_2Si_2O_7$, rustumite $Ca_4Si_2O_7(OH)_2$, $Ca_2SiO_4.0.3H_2O$, or $Ca_2SiO_4.0.35H_2O$. The solid phase contained 55.2% CaO, 14.7% $SiO_2$ and 23.9% F. The liquid phase was found to contain 0.13% CaO, 0.02% $SiO_2$ and 0.003% F.

EXAMPLE 2

The experiment of Example 1 was repeated, except that 37 g of 61% $P_2O_5$ was added to the water before the lime addition, to simulate a phosphoric acid plant pond water having 5% $P_2O_5$.

X-ray diffraction of the solid phase indicated the presence of fluorite and the possible presence of $Ca_2SiO_4$ or $Ca_3SiO_5$, or both. The solid was found to contain 46.7% CaO, 12.5% $SiO_2$ and 15.9% F. The liquid phase contained 0.068% CaO, 0.045% $SiO_2$ and less than the detectable amount of fluorine (<0.002%).

This Example indicates that the process is operative in media similar to phosphate pond water.

EXAMPLE 3

An experiment was performed to demonstrate that the calcium fluoride-containing product will not release significant amounts of Silicon to hot phosphoric acid solutions.

A phosphoric acid containing 50% $P_2O_5$ was mixed with sufficient sulfuric acid to yield a soluble sulfate concentration of 5%. To this was added the solid product of Example 1 to a level of 5% by weight. The mixture was heated to 80° C. and held for about four hours. No silica sol or gel formation was observed, and the ease with which the mixture was filtered indicated the lack of silica sol or gel.

EXAMPLE 4

An attempt was made to use the calcium fluoride-containing product in the removal of magnesium and other impurities from wet process phosphoric acid, by a process similar to those previously described in the cited art.

Wet process phosphoric acid, which was prepared by a hemihydrate-type process, analyzing about 49% by weight $P_2O_5$, was diluted to 40% $P_2O_5$ with deionized water and then concentrated by evaporation to 48% $P_2O_5$. The acid was "decolorized" by passing through activated carbon, which caused a color change from dark brown to light green. The product analyzed 0.59% by weight MgO and 2.0% by weight soluble sulfate.

A 1500 g charge of the 48% $P_2O_5$ phosphoric acid was charged to a two liter teflon TM lined stainless steel beaker. The beaker was fitted with a cover, through which an impeller (attached to an external stirring motor) was inserted. A port in the cover was used for sampling the beaker contents and for monitoring temperature with a thermometer. The beaker was surrounded on its sides by one inch of insulating material, and placed upon an electric hot plate.

To increase the soluble sulfate content of the phosphoric acid to 4.0%, a 32.43 g portion of 96.5% by weight reagent grade sulfuric acid was added to the beaker.

A 45.0 g portion of a calcium fluoride-containing material, prepared as in Example 1, was added to the beaker. The cover was placed on the beaker and both stirring and heating started.

After about 2.5 hours the beaker was sampled and analyzed for soluble sulfate. The analysis was 2.3% $SO_4$, and 5 ml of 95% reagent grade sulfuric acid was added. The temperature at this point was 84° C.

At about 20.5 hours the temperature was 80° C. and the soluble sulfate was found to be 4.5%. A sample taken for magnesium analysis contained 0.57% MgO.

The reaction was terminated. Although some magnesium had been removed, the reaction was not conducted for a sufficient time to remove the desired amount of impurities.

EXAMPLE 5

Example 4 was repeated, except that 1500 g of wet process phosphoric acid analyzing 49.7% by weight $P_2O_5$ and 0.59% by weight MgO was used as the starting material, 32.4 g of 96.5% by weight sulfuric acid produced a soluble sulfate of 4.8% and 187.5 g of calcium fluoride-containing material was added.

After heating and stirring for about 0.5 hours, the soluble sulfate was found to be 1.0%, and 31.9 g of the sulfuric acid was added to obtain a 3.% sulfate content.

When the reaction had proceeded for about 21 hours, the temperature was 79° C. and the soluble sulfate content 2.9%.

Heating and stirring was discontinued after about 22.5 hours. A sample taken for magnesium analysis contained 0.526% MgO.

The reaction was restarted after standing for about 2.5 days and continued for 24 hours. After centrifuging the beaker contents and filtering the solids out, the liquid analyzed 0.55% MgO.

This shows a better removal of magnesium, but is probably not the optimum condition for the desired reaction.

What is claimed is:

1. A process for the preparation of a calcium fluoride-containing solid, comprising the steps of:
   a. making a suspension of lime in water;
   b. heating the suspension of lime in water to a temperature at or near the boiling point of the suspension of lime in water;
   c. adding a fluosilicate-containing material to the heated suspension of lime in water to form a calcium fluoride-containing solid in which the silicon from the fluosilicate-containing material is present in chemical combination with calcium, the amount of calcium in said heated suspension being in excess of the stoichiometric amount required for conversion to calcium fluoride of all of the fluorine in said added fluosilicate-containing material and such excess being sufficient to form chemical compounds of silicon and calcium from the silicon in the added fluosilicate-containing material; and,
   d. recovering the calcium fluoride-containing solid.

2. The process of claim 1 in which the suspension of lime and water is heated to its boiling point.

3. The process of claim 1 in which the fluosilicate-containing material is a fluosilicic acid solution.

4. The process of claim 1 in which the fluosilicate-containing material is a water-soluble salt of fluosilicic acid.

5. The process of claim 1 in which the fluosilicate-containing material is a pond water resulting from phosphoric acid production.

6. The process of claim 1 in which a pH of about 12 or higher is maintained during the addition of the fluosilicate-containing material.

7. The process of claim 1 in which a temperature in the range of about 80° C. to the boiling point of the suspension is maintained during the addition of the fluosilicate-containing material.

8. A process for the preparation of a calcium fluoride-containing solid, comprising the steps of:
   a. suspending lime in water to produce a suspension having a pH of at least about 12;
   b. heating the suspension to its boiling point;
   c. gradually adding a solution of fluosilicic acid to the heated suspension in such amount that the pH of the suspension after said addition does not become less than about 12 to form a calcium fluoride-containing solid in which silicon from the fluosilicic acid is present in chemical combination with calcium, the amount of calcium in said heated suspension being in excess of the stoichiometric amount for conversion to calcium fluoride of all of the fluorine in said added fluosilicic acid and such excess being sufficient to form chemical compounds of silicon and calcium from silicon in the added fluosilicic acid;

d. continuing to boil the suspension for at least about 15 minutes after the addition of fluosilicic acid; and e. recovering the calcium fluoride-containing solid.

9. The calcium fluoride-containing solid prepared by the process of claim 1.

10. The calcium fluoride-containing solid prepared by the process of claim 8.

11. The process of claim 6 in which said pH is maintained by adding less than the stoichiometric amount of fluosilicate-containing material for reaction with the lime.

* * * * *